United States Patent [19]

Fleagle

[11] 3,833,268

[45] Sept. 3, 1974

[54] WHEEL SLIP CONTROL SYSTEM FOR AUTOMOTIVE VEHICLES AND THE LIKE

[75] Inventor: Joseph E. Fleagle, Overland, Mo.

[73] Assignee: Wagner Electric Corporation, Parsippany, N.J.

[22] Filed: Mar. 10, 1972

[21] Appl. No.: 233,579

[52] U.S. Cl. .............................. 303/21 BE, 303/20
[51] Int. Cl. ................................................ B60t 8/12
[58] Field of Search ........ 188/181 A; 303/20, 21 A;
317/5; 324/160–162; 340/52 R, 262, 263

[56] References Cited
UNITED STATES PATENTS

| | | | |
|---|---|---|---|
| 3,494,671 | 2/1970 | Slavin et al. ........................ | 303/21 P |
| 3,556,610 | 1/1971 | Leiber ............................... | 303/21 P |
| 3,578,819 | 5/1971 | Atkins ............................... | 303/21 BE |
| 3,640,588 | 2/1972 | Carp et al. ....................... | 303/21 BE X |
| 3,704,043 | 11/1972 | Hickner et al. .................. | 303/21 BE |

Primary Examiner—Milton Buchler
Assistant Examiner—Stephen G. Kunin
Attorney, Agent, or Firm—Eyre, Mann & Lucas

[57] ABSTRACT

A control system for varying the pressure applied to fluid-controlled brake actuating mechanisms upon detection of both a wheel deceleration in excess of a predetermined threshold and a subsequent incremental decrease in wheel velocity greater than a continuously-varying reference increment $\Delta v$ of wheel speed. This reference increment $\Delta v$ is inversely related to a variable reference signal which is directly related to the rate of change of wheel speed. Thus, the continuously-varying reference increment of wheel speed $\Delta v$ is inversely related to the rate of change of wheel speed. Consequently, the period of time between occurrence of a wheel deceleration in excess of said predetermined threshold and the relief of brake line fluid pressure is shorter when wheel speed decreases rapidly and longer when wheel speed decreases slowly. Compensation is thus made for varying road and load conditions, and for the characteristics of the braking mechanism which applies braking force to the wheel.

19 Claims, 3 Drawing Figures

WHEEL SLIP CONTROL SYSTEM FOR AUTOMOTIVE VEHICLES AND THE LIKE

CROSS-REFERENCE TO RELATED APPLICATION

The system disclosed herein advantageously incorporates the brake fluid pressure modulator disclosed and claimed in application Ser. No. 199,431 entitled Anti-Skid Mechanism and filed on Nov. 17, 1971 in the name of John A. Machek.

BACKGROUND OF THE INVENTION

The purpose of the present invention may best be understood with the aid of a brief explanation of the problem which is sought to be overcome. A vehicle's braking system is capable of effecting three different relationships of wheel rotation speed, i.e., the angular velocity of the wheel, to vehicle linear speed. These relationships are: (1) wheel rotation speed synchronized to vehicle linear speed (0 percent wheel slip), i.e., no relative motion between road surface and the portion of the wheel-mounted tire which is in contact with the road surface; (2) wheel rotation speed below synchronization with vehicle linear speed, a condition commonly referred to as wheel slip and quantified by the formula (Synchronous Wheel Speed — Actual Wheel Speed/Synchronous Wheel Speed) × 100 = percent Wheel Slip; and (3) wheel not rotating while vehicle is in motion, a condition commonly referred to as wheel skid (100 percent wheel slip). Any driver, by pressing on the brake pedal, can easily produce the first and last of these relationships. It is the second relationship, the wheel rotating below synchronization speed, that is very difficult to obtain even by a very experienced test driver. Road friction variations, vehicle loading and brake sensitivity and stability are several of the major reasons why this state is so difficult to obtain. Therefore, most drivers brake in such a manner that the vehicle wheels are either synchronized to vehicle speed or completely locked. Both of these situations may result in a straight-line stop, but there are exceptions. Generally, braked wheels that are synchronously rotating throughout the entire stop will give straight-line stops. Theoretically, locked wheels should also give straight-line stops, but frequently do not in actual practice because brakes do not always lock up at the same time. The small initial angular impulse resulting from non-simultaneous lock-up starts the vehicle rotating as it slides. As the center of gravity shifts further and further off center, inertial forces continue to rotate the vehicle. A rotational deviation of approximately 20° between the vehicle center line and vehicle direction vector makes it almost impossible to regain control. Therefore, maximum controllability can only be achieved with rolling wheels.

It has long been known that a rubber tire has maximum tractive force or "grip" on the road when it is pushed beyond the state of simple static traction, but not so far as to lose all its "gearing" with the road surface. This range of maximum traction occurs when the tire angular speed is below the corresponding linear speed of the vehicle, i.e., when there is some degree of wheel slip. As was pointed out earlier, wheel slip is the most difficult condition to attain. Recent information has also pointed out that impending skid stops on high friction surfaces do not shorten the stopping distance as much as on a low friction surface. On most surfaces, however, it has been found that maximum tractive forces occur when the tire angular speed is at least 10 percent lower than the angular speed at which the tire would be in synchronization with the linear vehicle speed. Therefore, on any given road surface, the shortest stop possible can only be made if this wheel slip condition is met. The purpose of the present invention is to achieve this condition by actuating a brake line pressure modulator after the angular deceleration of a braked wheel reaches a predetermined minimum value and wheel speed subsequently decreases by more than a continuously-varying reference increment.

SUMMARY OF THE INVENTION

The present invention is embodied in and carried out by a wheel-slip control system and various sub-combinations thereof, said system being operative to vary brake line pressure to achieve a desirable percentage of wheel-slip under widely varying conditions of vehicle load weight distribution and varying tire-road interface conditions. This high degree of adaptivity of applicants' wheel-slip control system derives from applicants' novel utilization of signals proportional to wheel velocity and rate of change of wheel velocity to determine when brake line pressure is to be reduced. More specifically, the decrease of the velocity of a selected wheel from the time a predetermined deceleration threshold has been exceeded by that wheel is monitored to determine if a predetermined increment $\Delta v$ has been exceeded, at which time a sharp reduction in brake line fluid pressure is effected. The increment of wheel speed $\Delta v$ is defined by the value of wheel speed at the time said deceleration threshold is exceeded and a reference signal which varies continuously and in direct relationship to the rate of change of wheel speed.

BRIEF DESCRIPTION OF THE DRAWINGS

The present invention may be better understood by reading the written description thereof with reference to the accompanying drawings, of which.

DETAILED DESCRIPTION OF THE PREFERRED EMBODIMENT

Figure 1:
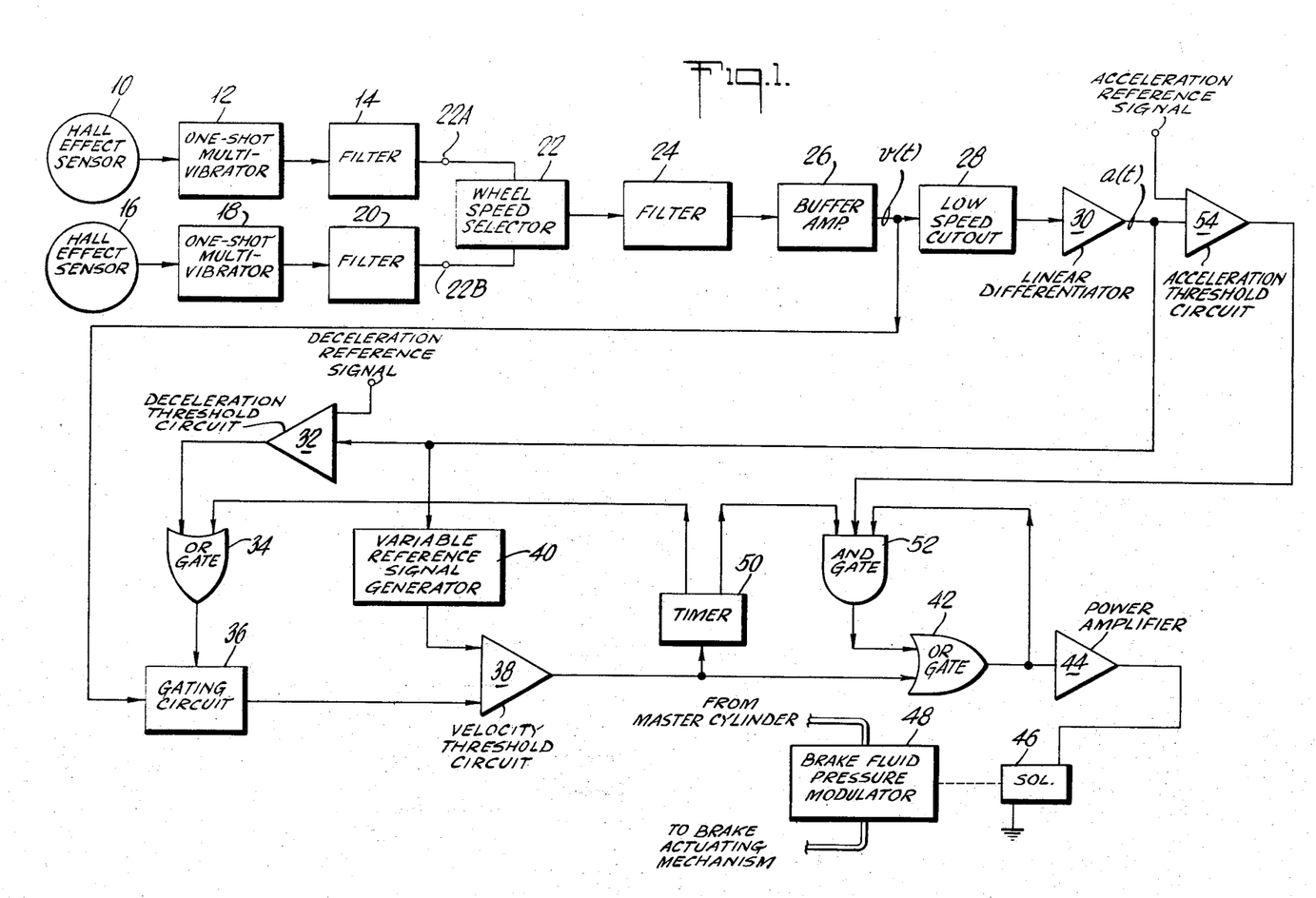
FIG. 1 is a block diagram of the preferred embodiment of applicants' wheel-slip control system.

Referring specifically to the block diagram shown in FIG. 1, first and second wheel speed signals are generated, the first by hall-effect sensor 10 connected to a first wheel so as to generate a continuous train of pulses varying in frequency in direct proportion to wheel speed. This pulse train is fed into a one-shot multivibrator 12, which in turn generates a variable-frequency train of pulses of constant amplitude and width. This train of standardized pulses is converted to a first wheel speed analog signal by filter 14. In like manner, a second wheel speed analog signal is generated by hall-effect sensor 16, one-shot multi-vibrator 18, and filter circuit 20. These wheel speed analog signals may be generated by various other means which are known or may become known in the art. Each of these wheel speed analog signals is fed into wheel speed selector circuit 22 which operates to select the signal representative of the lowest wheel speed for transmission through filter 24 to buffer amplifier 26. Although different selection criteria may be applied, this approach has been found to afford optimum results, particularly in terms of vehicle stability. Thus, a signal v(t) which is proportional to the speed of the slowest-rotating wheel is provided at the output of buffer amplifier 26. This signal is fed into the low speed cutout circuit 28, which passes the signal v(t) to linear differentiator 30 as long as the signal has a value representative of a wheel speed in excess of a predetermined minimum wheel speed (preferably 5 mph). The purpose of this feature is to prevent circuit noise, such as that present in the wheel speed signal v(t) at low speeds, from causing deceleration threshold circuit 32 to generate a spurious output pulse. Differentiator 30 in turn generates a signal a(t) proportional to the rate of change of the wheel speed signal v(t). The rate-of-change signal a(t) forms the variable input to deceleration threshold circuit 32, which compares a(t) to a deceleration reference signal which represents a predetermined value of wheel deceleration (preferably −1g ). When the rate-of-change signal a(t) exceeds the reference signal, a variable-width pulse is generated by threshold circuit 32. This pulse is fed to one input channel of OR gate 34, which in turn provides a gating pulse to gating circuit 36. Although the wheel speed analog signal v(t) is continuously fed to gating circuit 36, this signal will not be passed through to velocity threshold circuit 38 unless a gating pulse is provided to gating circuit 36 by OR gate 34. Once gating circuit 36 is actuated, the wheel speed signal v(t) is passed to velocity threshold circuit 38, which then monitors the decrease in v(t) from the initial value $V_1$ of v(t) at the time gating circuit 36 is actuated. Thus, the initial value $V_1$ is representative of the speed of the selected wheel at the time the deceleration threshold of circuit 32 was reached. As v(t) decreases due to the appliction of braking force to the wheel, velocity threshold circuit 38 compares the difference between the initial value $V_1$ and the wheel speed analog signal v(t) with a variable reference increment of wheel velocity $\Delta v$. This increment $\Delta v$ is defined by the difference between the initial value $V_i$, which is fixed in any given cycle but varies from cycle to cycle, and the instantaneous value of the output of reference signal generator 40, which increases or decreases as the rate-of-change signal a(t) increases or decreases, respectively. The net effect is to provide a continuously-variable reference increment of wheel velocity $\Delta v$ which is inversely related to the rate-of-change signal a(t). Thus, the more rapidly the monitored wheel decelerates upon initial braking, the sooner velocity threshold circuit 38 will produce a variable-width slip pulse which will be fed to OR gate 84. In response to this slip pulse, OR gate 42 initiates generation of a solenoid-controlling output pulse which is amplified by power amplifier 44. This output energizes the solenoid 46 which in turn actuates the brake fluid pressure modulator 48. Thus, at this point in the operating cycle, brake line fluid pressure is relieved. The rate-of-change signal a(t) consequently decreases from its deceleration threshold-exceeding value, thereby terminating the output pulse of deceleration threshold circuit 32.

The timer 50 is also actuated by the initiation of the variable-width slip pulse generated by velocity threshold circuit 38. For a predetermined period of time measured from such actuation, preferably about 0.16 second, timer 50 provides a logic 1 input to OR gate 34 so that gating circuit 36 will remain actuated after termination of the variable-width pulse generated by deceleration threshold circuit 32, in the event the termination of that pulse occurs before the output of timer 50 terminates. Thus, comparison of the velocity signal v(t) with the initial value $V_1$ of that signal can continue after the deceleration of the selected wheel falls below the reference threshold of circuit 32. The output pulse of velocity threshold circuit 38 can be terminated by either (1) wheel spin-up beyond the threshold value determined by reference signal generator 40 and initial wheel speed value $V_1$, or (2) termination of the output of timer 50. For the same predetermined period of time, the timer 50 provides a logic 0 input to AND gate 52 in order to disable it from generating an output. The reasons for this operational feature will become apparent further on in this description.

As the selected wheel speed increases, the output pulse of velocity threshold circuit 38 will terminate when wheel speed analog signal v(t) reaches a value at which the difference between it and the initial value $V_1$ is less than the now increasing reference increment $\Delta v$ resulting from the decreasing output of variable reference signal generator 40. As pointed out earlier, the magnitude of this reference increment $\Delta v$ is inversely related to the magnitude of the rate-of-change signal a(t). Upon termination of the output pulse of velocity threshold circuit 38, the solenoid-controlling output pulse of OR gate 42 is terminated, resulting in de-energization of the solenoid 46. This completes one typical cycle of the signal processing circuit. As this cycle is repeated, decreasing initial values $V_2, V_3, \ldots V_n$ of the decreasing wheel speed analog signal v(t) are employed in combination with the continuously-varying output of reference signal generator 40 to define $\Delta v$ within each cycle.

Under certain conditions, e.g., on a low-friction surface, it is possible for the monitored wheel to develop a considerable degree of slip before it reaches the predetermined deceleration threshold. Consequently, the decrease in wheel speed measured from the time the deceleration threshold is exceeded is not truly representative of wheel slip, since the measurement has begun late. Also, it may happen that the monitored wheel decelerates so sharply that due to electronic processing lags, the sample $V_1$ is not a good approximation of synchronous wheel speed. The result in both of these cases is that the wheel locks up because brake fluid line pressure is not relieved either fast enough or long enough. To overcome such problem situations, the signal processing circuit includes means for providing an input to OR gate 42 whenever the output of velocity threshold circuit 38 has a duration longer than the predetermined period of time during which timer 50 generates its outputs after actuation by the leading edge of the variable-width slip pulse. Specifically, OR gate 42, AND gate 52 and acceleration threshold circuit 54 operate to extend the period of relief of brake fluid line pressure under the aforementioned conditions. If the monitored wheel has not accelerated to a speed which will cause termination of the variable-width slip pulse generated by velocity threshold circuit 38 at the time the timer 50 returns to its normal condition and provides a logic 0 input to OR gate 34 and a logic 1 input to AND gate 52, then AND gate 52 can be enabled by an output from acceleration threshold circuit 54. The acceleration reference signal fed into threshold circuit 54 is representative of a predetermined value of wheel acceleration (preferably +2g). Since brake fluid line pressure is still at zero when timer 50 returns to its normal condition, the wheel must be accelerating toward synchronous velocity at that time. If such acceleration is greater than the acceleration reference signal fed into threshold circuit 54 when the slip pulse output of velocity threshold circuit 38 terminates, then logic 1 inputs will coincidentally be fed to each of the three input channels of AND gate 52, which will in turn generate a logic 1 output. Thus, the output of OR gate 42 is continued, without interruption, by the application of this input from AND gate 52 to one input channel just before the input formed by the slip pulse generated by velocity threshold circuit 38 is removed from the other input channel. As a result, solenoid 46 remains energized until the acceleration of the monitored wheel falls below the value represented by the acceleration reference signal fed into threshold circuit 54. By thus extending the period of time in which brake fluid line pressure is at zero, it is assured that the monitored wheel will spin-up close to synchronous velocity.

From the foregoing description, it will be readily apparent that the output generated by AND gate 52 must be applied to one input channel of OR gate 42 before the slip pulse output of velocity threshold circuit 38 is removed from the other input channel of OR gate 42. Operation of the circuit in this manner is ensured by the fact that the cumulative delay time through the timer 50, the OR gate 34, the gating circuit 36 and the velocity threshold circuit 38 is significantly longer than the cumulative delay time through OR gate 42 and AND gate 52. Thus, AND gate 52 will always be able to provide a parallel input to one channel of OR gate 42 before the termination of the slip pulse input to the other channel of OR gate 42. Therefore, a race condition is never developed in the output-pulse-extending circuitry.

Figure 2:
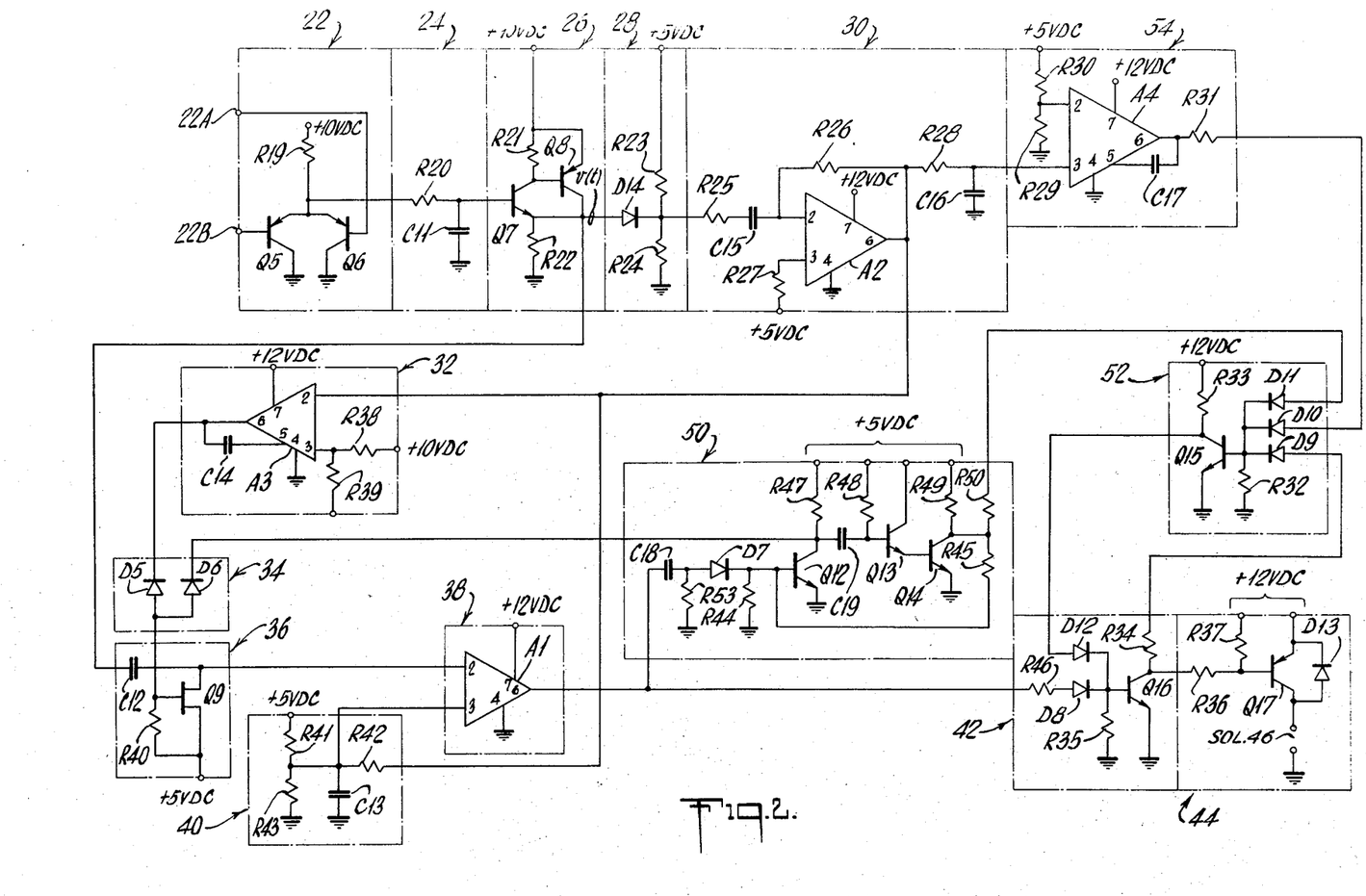
FIG. 2 is a schematic wiring diagram of the signal processing circuitry included in the block diagram of FIG. 1.

Referring now specifically to the schematic wiring diagram of FIG. 2, this represents a preferred form of the signal processing circuitry in the system shown in FIG. 1. It will be readily apparent that there is a direct correlation between the sub-circuits in this figure, and the sub-circuits shown in block form in FIG. 1, and the same reference numerals are employed in both figures to facilitate such correlation. In the preferred embodiment of the signal processing circuitry shown in FIG. 2, the values and/or part numbers of the various circuit components are as follows:

| Resistances | | Capacitances | |
|---|---|---|---|
| R19 | — 6.8K ohms | C11 | — 1 microfarad |
| R20 | — 15K ohms | C12 | — 1 microfarad |
| R21 | — 6.8K ohms | C13 | — 1 microfarad |
| R22 | — 680 ohms | C14 | — 100 picofarads |
| R23 | — 1K ohm | C15 | — 1 microfarad |
| R24 | — 15K ohms | C16 | — .047 microfarad |
| R25 | — 4.7K ohms | C17 | — 100 picofarads |
| R26 | — 430K ohms | C18 | — .047 microfarad |
| R27 | — 1K ohm | C19 | — 1 microfarad |
| R28 | — 33K ohms | | |

-Continued

| R29 | — 12K ohms |
| R30 | — 2.2K ohms |

| Resistances | | Diodes | |
|---|---|---|---|
| R31 | — 33K ohms | D5 | — 1N914 |
| R32 | — 15K ohms | D6 | — 1N914 |
| R33 | — 3.9K ohms | D7 | — 1N914 |
| R34 | — 33K ohms | D8 | — 1N914 |
| R35 | — 10K ohms | D9 | — 1N914 |
| R36 | — 100 ohms | D10 | — 1N914 |
| R37 | — 1K ohm | D11 | — 1N914 |
| R38 | — 12K ohms | D12 | — 1N914 |
| R39 | — 1K ohm | D13 | — 1N4754 |
| R40 | — 22K ohms | | |
| R41 | — 360 ohm | | |
| R42 | — 6.8K ohms | Transistors | |
| R43 | — 10K ohms | | |
| R44 | — 10K ohms | Q5 | — 2N4250 |
| R45 | — 33K ohms | Q6 | — 2N4250 |
| R46 | — 3.9K ohms | Q7 | — 2N3565 |
| R47 | — 2.2K ohms | Q8 | — 2N4250 |
| R48 | — 100K ohms | Q9 | — 2N4220 |
| R49 | — 2.2K ohms | Q12 | — 2N3567 |
| R50 | — 10K ohms | Q13 | — 2N3565 |
| R51 | — 10 ohms | Q14 | — 2N3567 |
| R53 | — 10K ohms | Q15 | — 2N3565 |
| | | Q16 | — 2N3567 |
| | | Q17 | — MJE2901 |

| Integrated Circuits | |
|---|---|
| A1 | — AD741H |
| A2 | — AD741H |
| A3 | — MC1709G |
| A4 | — MC1709G |

Figure 3:
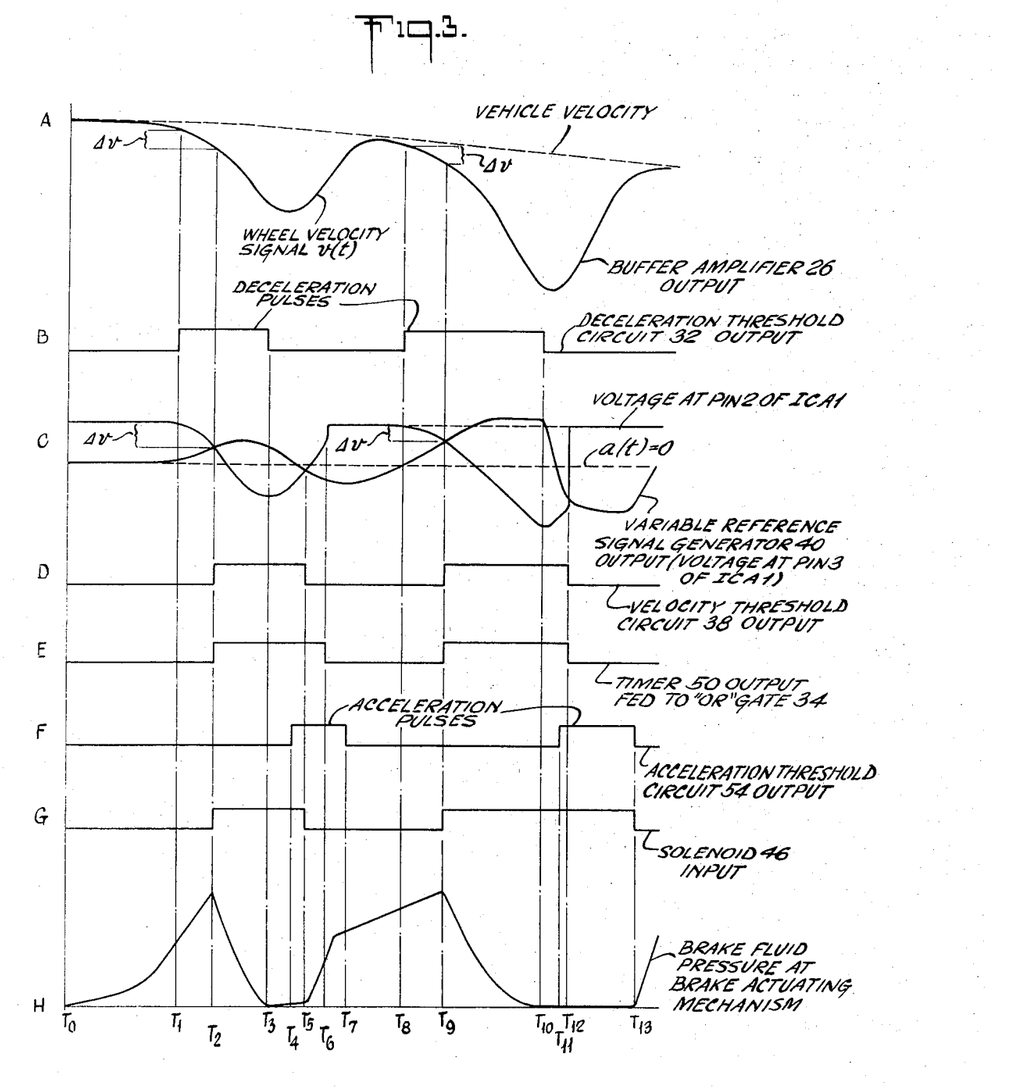
FIG. 3 comprises a series of graphs representative of values of several significant parameters during two different cycles of the wheel-slip control system illustrated in FIGS. 1 and 2, all of said graphs having a common time base.

Referring now specifically to the graphs of FIG. 3, the initial cycles illustrates the operation of applicant's system when the monitored wheel is travelling over a high-friction surface, i.e., a dry road. The initiation of the application of brake fluid pressure (graph H) to the brake actuating mechanism occurs at time $T_0$. As brake fluid pressure rises and causes the application of increasing braking force to the wheel, the wheel decelerates and exceeds the threshold value of deceleration which is fed into deceleration threshold circuit 32 at time $T_1$. Thus, deceleration threshold circuit 32 initiates the generation of a deceleration pulse (graph B) at time $T_1$. Simultaneously, circuit 36 is actuated to pass the wheel speed signal v(t) to velocity threshold circuit 38 for comparison (graph C) when the variable reference increment of speed $\Delta v$ is exceeded, i.e., when the value of the voltage pin 2 of IC A1 falls below the output of the variable reference signal generator 40 (the voltage at pin 3 of IC A1), generation of a slip pulse is initiated by velocity threshold circuit 38 at time $T_2$. Simultaneously, timer 50 initiates the generation of a logic 1 output which is fed to OR gate 34 (graph E) and a logic 0 output of the same duration which is fed to AND gate 52. Initiation of an actuating input to solenoid 46 (graph G) occurs simultaneously with the initiation of the slip pulse (graph D). Thus, brake fluid pressure drops sharply from time $T_2$. The resultant decrease in braking force causes wheel deceleration to fall below the threshold of deceleration threshold circuit 32 and the deceleration pulse of the circuit is consequently terminated at time $T_3$. As may be seen from the wheel velocity signal (graph A), wheel velocity begins to increase shortly after time $T_3$. As the wheel accelerates, it exceeds the threshold of acceleration threshold circuit 54, thereby causing the initiation of acceleration pulse (graph F) at time $T_4$. However, AND gate 52 remains disabled by the logic 0 input from timer 50 (not shown), which input is concurrent with the logic 1 output of timer 50 (graph E). Thus, AND gate 52 will not generate an output. When the slip pulse (graph D) terminates at time $T_5$ as a result of the wheel velocity signal (graph A) having increased sufficiently to cause the voltage at pin 2 of IC A1 to exceed the decreasing variable reference signal applied to pin 3 of IC A1, the input to solenoid 46 (graph G) is simultaneously terminated. Since the output of OR gate 42 terminates with the termination of the slip pulse, another of the necessary inputs to AND gate 52 is removed. Consequently, the output of OR gate 42 will not be extended in this cycle by an output from AND gate 52.

With the de-energization of solenoid 46, brake fluid pressure begins to rise sharply. The sudden decrease in the rate of increase of brake fluid pressure which occurs between time $T_6$ and $T_7$ is a result of the characteristic of the brake fluid pressure modulator which is preferably employed in applicant's system and which is the subject of the copending patent application cross-referenced at the beginning of this specification. At time $T_6$, the fixed period of timer 50 runs out and the logic 1 signal fed to OR gate 34 terminates. Simultaneously, the disabling logic 0 signal fed to AND gate 52 also terminates. As the wheel approaches synchronous velocity, its acceleration decreases to a level which is below the threshold of acceleration threshold circuit 54. Consequently, acceleration pulse generated by that circuit (graph F) terminates at time $T_7$. Thus, one typical cycle of the system has been completed.

The second cycle shown in FIG. 3 illustrates the operation of applicant's system when the monitored wheel is travelling over a low-friction surface, i.e., an oil slick or a patch of ice on the road. With the brake fluid pressure still increasing beyond time $T_7$, the wheel will again begin to decelerate until it exceeds the deceleration reference signal of threshold circuit 32 at time $T_8$, at which time generation of a deceleration pulse is initiated (graph B). When the wheel speed signal curve and the variable reference signal curve (graph C) again intersect at time $T_9$, velocity threshold circuit 38 again initiates generation of a slip pulse (graph D), solenoid 46 is energized (graph G), and timer 50 again generates a logic 1 output which is fed to OR gate 34, along with a logic 0 output which is fed to AND gate 52 to disable same. Because of the response time delay introduced by the inertia of the braking mechanism and the lack of traction of the wheel on the slippery surface, wheel velocity drops sharply (graph A) even though brake fluid line pressure (graph H) is rapidly reduced after time $T_9$. The wheel is very nearly locked up at time $T_{10}$, at which time the deceleration pulse (graph B) terminates. Subsequently, wheel velocity begins to increase and causes the initiation of an acceleration pulse (graph F) at time $T_{11}$. However, the slip pulse generated by velocity threshold circuit 38 (graph D) terminates at time $T_{12}$ as a result of the expiration of timer 50. However, wheel velocity is still far below synchronous velocity at this time. Thus, the input to solenoid 46 (graph G) is extended by generation of an output by AND gate 52 in response to the logic 1 input from the output of OR gate 42, the logic 1 input from the acceleration threshold circuit 54, and the logic 1 input from timer 50 which results when the fixed period of time of timer 50 runs out. As previously explained in connection with FIG. 1, the cumulative time delay in the loop from the output of velocity threshold circuit 38 through timer 50, OR gate 34, gating circuit 36 and velocity threshold circuit 38 are longer than the cumulative time delay in the loop through OR gate 42 and AND gate 52, so that a race condition will not develop at the input of OR gate 42. So long as AND gate 52 produces an output, the input to solenoid 46 (graph G) will be extended. During this period of time, brake fluid pressure at the brake actuating mechanism (graph H) is held at zero level. Consequently, the wheel velocity (graph A) will increase rapidly. As synchronous wheel velocity is approached, wheel acceleration begins to decrease and causes termination of the acceleration pulse generated by acceleration threshold circuit 54 at time $T_{13}$. This removes one of the necessary inputs to AND gate 52, which results in termination of the output of AND gate 52 and consequently of OR gate 42. Thus, the input to solenoid 46 (graph G) is also terminated at time $T_{13}$. The system has completed another typical cycle.

Various significant advantages are afforded by the wheel slip control system just described. The rate compensation feature embodied in the variable reference signal generator enables the system to provide a more uniform percentage of slip from cycle to cycle for varying road coefficients and load values of distribution. Also, the determination of brake reapplication time according to wheel velocity, wheel acceleration, and the value of wheel speed at the time skid commenced in each cycle makes the system highly adaptive to a wide range of conditions which affect these parameters. This flexibility of the system's response is also derived from the rate compensation feature, i.e., the provision of a continuously-variable reference signal directly proportional to the rate of change of wheel speed, to the velocity threshold circuit to develop a variable reference increment of wheel speed $\Delta v$. Furthermore, the system has a high degree of immunity to spurious decelerations which do not result in a substantial change in wheel speed. Such decelerations may be caused by bumps in the road, peculiarities of the vehicles' suspension system and flexing of the wheel-mounted tires. Such spurious decelerations cause only the generation of a brief deceleration pulse, which in and of itself cannot cause a change in braking force. Larger wheel velocity changes which indicate a true skid cause the brake fluid pressure modulator to be actuated by the solenoid, thereby affecting sharp relief of brake fluid pressure and consequently braking force.

These and other advantages of the present invention, as well as certain changes and modifications of the disclosed embodiment thereof, will be readily apparent to those skilled in the art. For example, DC generators having the proper range of output voltages could be connected to the vehicle wheels to provide a voltage which is proportional to the speed of each vehicle wheel, thus replacing the combinations of hall-effect sensor, one-shot multi-vibrator and filter in the embodiment disclosed herein. In addition, rather than select one of a plurality of wheel speed signals as the input to the signal processing circuitry, a single preselected wheel assembly could be fitted with a generating device to provide a signal directly to the buffer amplifier of applicant's system, thereby obviating the need for a wheel speed selector. The disclosed embodiment could also be reduced to more basic configurations by the elimination of various component circuits. For example, the low speed cut-out could be removed and the output of the buffer fed directly to the linear differentiator. Alternatively, the low speed cut-out disclosed herein could be replaced by the circuitry which performs a similar function in copending U.S. Pat. application Ser. No. 218,378 entitled WHEEL SLIP CONTROL SYSTEM FOR AUTOMOTIVE VEHICLES AND THE LIKE filed on Jan. 17, 1972 in the name of Joseph E. Fleagle. The timer 50 could be removed, with the output of velocity threshold circuit 38 being fed directly to OR gate 34. A more rudimentary system could also be formed by removing OR gate 42 and AND gate 52 and acceleration threshold circuit 54, i.e., the means by which the input to solenoid 46 is extended beyond the termination of the output of velocity threshold circuit 38, with the latter being directly connected to power amplifier 44. Brake fluid pressure modulators other than that disclosed in the copending patent application cross-referenced herein could be incorporated in applicant's system. It is the applicant's intention to cover all such changes and modifications which could be made to the embodiment of the invention herein chosen for the purposes of the disclosure without departing from the spirit and scope of the invention.

What is claimed is:

1. A wheel slip control system for a vehicle having at least one wheel with an associated brake and an actuating mechanism therefor, comprising:
   1. first means operative to generate an output whenever the change in rotational velocity of a selected wheel, from the value of said rotational velocity at the time the rate of change of said rotational velocity exceeds a predetermined threshold, exceeds a variable reference increment of wheel speed inversely related to said rate of change of rotational velocity; and
   2. second means operative in response to said output to effect a decrease in the brake fluid pressure applied to at least the actuating mechanism of the brake associated with said selected wheel.

2. The system according to claim 1 wherein said first means includes means operative to extend the duration of said output whenever both (a) a predetermined period of time is exceeded by the period of time during which the change in rotational velocity of the selected wheel, from the value of said rotational velocity at the time said rate of change of rotational velocity exceeds said predetermined threshold, exceeds a variable reference increment of wheel speed and (b) the rotational acceleration of said selected wheel exceeds a predetermined threshold.

3. The system according to claim 1 wherein said second means comprises solenoid-actuated brake fluid pressure modulator means operative in response to said output to effect a decrease in the brake fluid pressure applied to at least the actuating mechanism of the brake associated with said selected wheel.

4. A wheel slip control system for a vehicle having at least one wheel with an associated brake and an actuating mechanism therefor, comprising:
   1. first means operative to generate a first variable-width pulse when the rate of change of the rotational velocity of a selected wheel exceeds a predetermined threshold, and to generate a second variable-width pulse when the change in rotational velocity of the selected wheel, from the value of said rotational velocity at the time said first variable-width pulse is initiated, exceeds a variable reference increment of wheel speed inversely related to said rate of change of rotational velocity; and
   2. second means operative in response to at least said second variable-width pulse to effect a decrease in the brake fluid pressure applied to at least the actuating mechanism of the brake associated with said selected wheel.

5. The system according to claim 3 wherein said first means comprises:
   1. first signal means operative to generate a first signal directly proportional to the rotational velocity of said selected wheel;
   2. second signal means operative to generate a second signal directly proportional to the rate of change of rotational velocity of said selected wheel;
   3. first comparison means operative to generate said first variable-width pulse whenever said rate of change of the rotational velocity of said selected wheel exceeds said predetermined threshold;
   4. variable reference signal generator means operative to receive said second signal and to generate a variable reference signal directly related to said second signal, the difference between the value of said first signal at the time of initiation of said first variable-width pulse and said variable reference signal being representative of said variable reference increment of wheel speed; and
   5. second comparison means operative to receive said variable reference signal and to receive said first signal after initiation of said first variable-width pulse, and to generate a second variable-width pulse whenever the difference between said first signal and its value at the time of initiation of said first variable-width pulse exceeds said variable reference increment of wheel speed.

6. The system according to claim 5 wherein said first means further comprises low speed detector means operative, whenever said rotational velocity of said selected wheel falls below a predetermined minimum speed, to prevent generation of said first variable-width pulse.

7. The system according to claim 5 wherein said second comparison means comprises gating circuit means operative in response to at least the initiation of said first variable-width pulse to enable said second comparison means to initiate its comparison function.

8. The system according to claim 7 wherein said first means further comprises:
   1. timer means operative to generate at least a first output for a predetermined time after the initiation of said second variable-width pulse; and
   2. first logic means operative in response to either said first variable-width pulse or said first output of said timer means to actuate said gating circuit means.

9. The system according to claim 8 wherein said first means further comprises:
   1. third comparison means operative to generate a third variable-width pulse whenever said rate of change of the rotational velocity of said selected wheel exceeds a predetermined threshold;
   2. second logic means operative to generate an output in response to either said second variable-width pulse output from said second comparison means or the output from 3. third logic means operative in response to the coincidence of a second output from said timer means, a third variable-width pulse output from said third comparison means, and an output from said second logic means to extend the output of said second logic means after termination of said second variable-width pulse output from said second comparison means.

10. The system according to claim 9 wherein said second logic means comprises an OR gate, and said third logic means comprises an AND gate.

11. The system according to claim 9 wherein said first means further comprises power amplifier means operative to receive and amplify the output from said second logic means.

12. The system according to claim 9 wherein said second means comprises solenoid-actuated brake fluid pressure modulator means operative in response to the output of said second logic means to effect a decrease in the brake fluid pressure applied to at least the actuating mechanism of the brake associated with said selected wheel.

13. A method of controlling the degree of slip of at least one breakeable vehicle wheel, comprising essentially the steps of:
   1. monitoring the speed of said wheel;
   2. monitoring the rate of change of the speed of said wheel;
   3. generating a variable reference increment of wheel spaced inversely related to the rate of change of the speed of said wheel; and
   4. reducing the braking force applied to at least said wheel during at least each period of slip time in which the reduction in wheel speed exceeds said variable reference increment of wheel speed, said reduction in wheel speed being measured from the value of wheel speed at the time the rate of change of wheel speed exceeds a first predetermined threshold.

14. The method according to claim 13 comprising the additional step of extending the period of reduction of braking force whenever both (1) said period of slip time exceeds a predetermined value and (2) the rate of change of the speed of said wheel exceeds a second predetermined threshold.

15. The method according to claim 13 wherein said step of reducing braking force during at least said periods of slip time is performed continuously after the rate of change of wheel speed first exceeds said predetermined threshold as a result of the application of braking force until a predetermined low value of wheel speed is reached.

16. The method according to claim 13 wherein the monitored vehicle wheel is the wheel having the lowest velocity.

17. The method according to claim 13 wherein said step of reducing braking force comprises the step of initiating the reduction of braking force after said reduction in wheel speed exceeds said variable reference increment of wheel speed.

18. The method according to claim 13 wherein said step of reducing braking force comprises the step of terminating the reduction of braking force after the wheel speed increases to a value which does not differ from the value of wheel speed at the time the rate of change of wheel speed exceeded said first predetermined threshold by more than said variable reference increment of wheel speed.

19. The method according to claim 13 wherein said step of reducing braking force comprises the step of terminating the reduction of braking force after both (1) said period of slip time has exceeded a predetermined value and (2) the rate of change of the speed of said wheel has fallen below a second predetermined threshold which was exceeded at the time said period of slip time exceeded said predetermined value.

* * * * *

UNITED STATES PATENT OFFICE
CERTIFICATE OF CORRECTION

Patent No. 3,833,268  Dated September 3, 1974

Inventor(s) Joseph E. Fleagle

It is certified that error appears in the above-identified patent and that said Letters Patent are hereby corrected as shown below:

Col. 10, Line 9 - Claim 5 - "according to claim 3" should read "according to claim 4--

Col. 11, Line 30 - Claim 13 - "spaced inversely" should read --speed inversely--

Signed and sealed this 24th day of December 1974.

(SEAL)
Attest:

McCOY M. GIBSON JR.
Attesting Officer

C. MARSHALL DANN
Commissioner of Patents